(12) United States Patent
Iacovacci et al.

(10) Patent No.: US 6,278,093 B1
(45) Date of Patent: Aug. 21, 2001

(54) INDUSTRIAL APPARATUS TO HEAT FOODSTUFFS, PARTICULARLY MEAT-PRODUCTS, BY MEANS OF A RADIO FREQUENCY OSCILLATING ELECTROMAGNETIC FIELD

(75) Inventors: Vittorio Iacovacci, Fondi; Manlio Ernesto Cavestro, Quinto di Verona, both of (IT)

(73) Assignees: Cesare Fiorucci S.p.A., Pomezia; Stalam S.p.A., Nove, both of (IT)

( * ) Notice: Subject to any disclaimer, the term of this patent is extended or adjusted under 35 U.S.C. 154(b) by 0 days.

(21) Appl. No.: 09/331,796

(22) PCT Filed: Dec. 23, 1997

(86) PCT No.: PCT/IT97/00316
  § 371 Date: Aug. 23, 1999
  § 102(e) Date: Aug. 23, 1999

(87) PCT Pub. No.: WO98/27823
  PCT Pub. Date: Jul. 2, 1998

(30) Foreign Application Priority Data

Dec. 23, 1996 (IT) .............................. BO96A0683

(51) Int. Cl.⁷ .............................. H05B 6/10; H05B 6/40; H05B 6/60
(52) U.S. Cl. ..................... 219/601; 219/624; 219/621; 219/771; 219/775; 99/DIG. 14; 99/451; 426/237
(58) Field of Search ................... 219/601, 620, 219/621, 622, 624, 725, 732, 734, 762, 771, 774, 780, 775; 99/DIG. 14, 451, 358; 426/237, 241, 243

(56) References Cited

U.S. PATENT DOCUMENTS

| | | | | |
|---|---|---|---|---|
| 2,903,543 | * | 9/1959 | Rueggeberg | 219/780 |
| 4,522,834 | * | 6/1985 | Miyahara | 99/358 |
| 4,974,503 | * | 12/1990 | Koch | 219/771 |
| 4,980,530 | * | 12/1990 | Butot | 219/601 |

FOREIGN PATENT DOCUMENTS

| | | | | |
|---|---|---|---|---|
| 0 278 592 | * | 7/1956 | (EP) . | |
| 752885 | * | 7/1956 | (GB) | 219/672 |
| 835984 | * | 6/1960 | (GB) . | |
| 904371 | * | 8/1962 | (GB) | 219/771 |
| 88 02222 | * | 7/1956 | (WO) . | |

* cited by examiner

Primary Examiner—Philip H. Leung
(74) Attorney, Agent, or Firm—Flynn, Thiel, Boutell & Tanis, P.C.

(57) ABSTRACT

An industrial apparatus to heat foodstuffs, particularly meat-products, including a generator of voltage oscillating at a predetermined radio frequency and an application system to generate an electromagnetic field oscillating at a predetermined radio frequency. The electromagnetic field includes electric and magnetic components which combine, both involving a food product, also a large-size one, to heat at a uniform temperature the entire mass of the food product (P) itself. The application system includes a first application device (12) connected with the generator of oscillating voltage and having the shape of a tunnel.

19 Claims, 2 Drawing Sheets

INDUSTRIAL APPARATUS TO HEAT FOODSTUFFS, PARTICULARLY MEAT-PRODUCTS, BY MEANS OF A RADIO FREQUENCY OSCILLATING ELECTROMAGNETIC FIELD

FIELD OF THE INVENTION

This invention relates to an industrial apparatus to heat foodstuffs, particularly meat-products, by means of a radio frequency oscillating electromagnetic field. This invention particularly, but not exclusively, concerns an apparatus to heat, and as a particular case of heating, to cook, meat-products having considerable mass and volume, preferably placed into moulds, such as baked ham and alike.

BACKGROUND OF THE INVENTION

Well-known radio frequency heating apparatus include an electric generator which produces a voltage oscillating at a predetermined frequency, typically established by international rules and equivalent to 6.78-13.56-27.12 or 40.68 MHz, and a capacitive or inductive application device transforming the oscillating voltage in an oscillating electric or magnetic field, respectively.

If the food products have a substantially dielectric behaviour, capacitive application devices are normally used which generate an oscillating electric field involving the food product. The dielectric loss within the product causes the heating thereof. On the contrary, if the food products substantially have a conductive behaviour, inductive application devices are normally used which generate an oscillating magnetic field involving the food product. The electric currents so induced to the conductive product cause the heating thereof.

Tests have been made on meat-products, such as hams, mainly made of meat, fats and salts. This combination of substances behaves in a way which is neither fully dielectric nor fully inductive. Particularly, it has been noted that if an electric field oscillating at 27.12 MHz is applied to a ham having a considerable mass, the electric field hardly penetrates the food product, thus heating quickly enough a layer which is about 2–3 cm thick, while the internal part of the products can not be heated satisfactorily. For this reason, the well-known apparatus operating according to the principle of the dielectric loss can effectively cook meat-products only when the mass and volume of said products are relatively small.

Another problem affecting the above-mentioned known apparatus is that the distance between the frame of the capacitive application device and the meat-products must be as little as possible. For this reason such apparatus are almost exclusively used to cook products having predetermined geometric shapes, usually a tubular shape.

Cooking tests have been made on meat-products having a considerable mass also by using apparatus having inductive application devices. In this case, it has been found that the products can be heated more quickly than by using the dielectric loss system but, however, it does not ensure a total penetration of the field into the mass of the meat-product because of the imperfect, incomplete and non-homogeneous conductive behaviour of the product.

This invention has the purpose to solve the problems encountered when cooking and/or heating by radio frequency meat-products by means of the well-known apparatus.

Another purpose of this invention is to provide an apparatus which may be easily and economically manufactured, used and maintained, and which may be used also in the case that foodstuffs must be placed into moulds having various shapes.

SUMMARY OF THE INVENTION

In order to achieve the above purposes, the invention concerns an apparatus to heat food products including a generator of voltage oscillating at a predetermined radio frequency and an application device to generate an electromagnetic field oscillating at the predetermined frequency. The electromagnetic field includes electric and magnetic components which combined, both act to heat at a uniform temperature the entire mass of a large-size food product.

The invention also concerns a container which is particularly proper to cook and/or heat meat-products in an apparatus as mentioned above.

An advantage of this invention is that the apparatus may be easily integrated within an industrial system to cook foodstuffs, particularly a system of continuous cooking. Furthermore, when this invention is applied to the cooking of hams, one of the advantages is the considerable reduction of the cooking time if compared to the traditional methods of steam-cooking and, more particularly, a reduction equivalent to at least 80%.

BRIEF DESCRIPTION OF THE DRAWINGS

Further characteristics and advantages of this invention will be shown by the following detailed description of a preferred embodiment, with reference to the drawings which shall be considered as a non-restrictive example, in which.

DETAILED DESCRIPTION OF THE INVENTION

Figure 1:
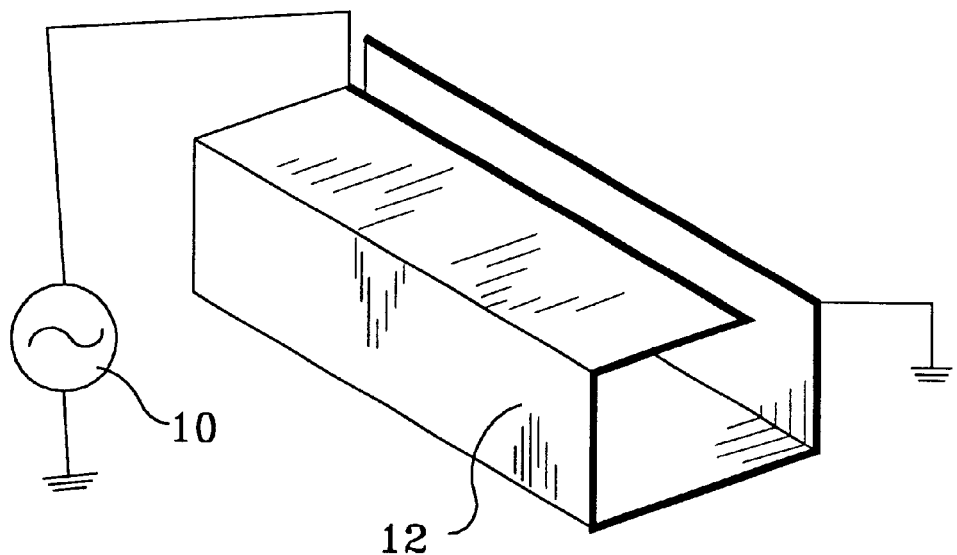
FIG. 1 is a schematic perspective view of a tunnel-shaped application device used in the apparatus according to this invention.

Now, referring to the drawings, an apparatus to heat a meat-product P includes a generally known electric generator 10 which produces, at its ends, a voltage oscillating at a pre-determined frequency, which international rules on radio frequency allow to choose among 6.78-13.56-27.12 or 40.68 MHz. The voltage produced by the electric generator 10 is supplied to a metal tunnel-shaped inductive application device 12 within which an oscillating magnetic field is consequently produced.

Figure 2:
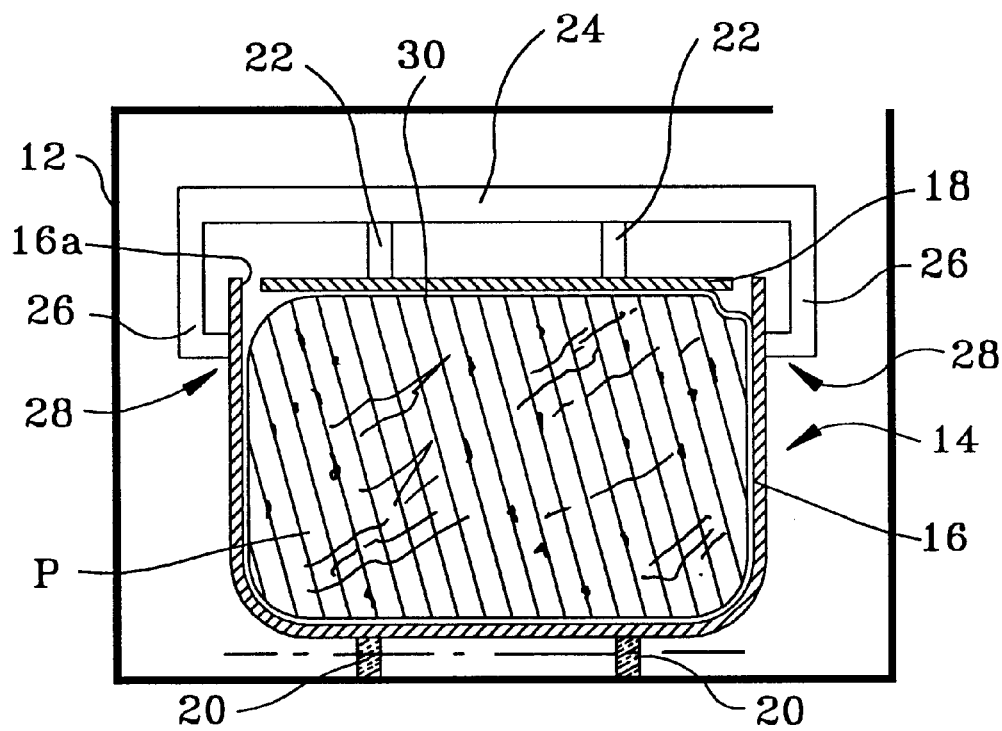
FIG. 2 is a cross-sectional view of the tunnel-shaped application device of FIG. 1, in which a container carrying a meat-product to be cooked is inserted.

As it may be seen from FIG. 2, a container or mould 14, which includes a tray 16 and a cover 18, both made of metal, may be placed into the tunnel-shaped application device 12. The cover 18 is slightly smaller than the lead-in edge 16a of the tray 16 so that, once the container is closed, an insulating continuous hollow space is formed. Alternatively or additionally, a seal or seam made of insulating material may be placed between the cover 18 and the tray 16.

The container 14 may be moved along the tunnel 12 on conveyor means such as rollers or wheels 20. Alternatively, the container may be placed on a conveyor belt or similar device placed within the tunnel and which is movable from one end to the other of the same. According to two alternative embodiments of the invention, the conveyor means 20 may be made of conductive material or insulating material, for the reasons which will become more evident below. The meat-product P is placed into the container 14 and is pressed from the above by the cover 18 by means of pressure members 22, which may be rigid or elastic, connected to a C-shaped transversal bar 24 coupled to the opposed sides of the trays 16. The meat-product P is sometimes enclosed in a sealed packaging 30.

The cover 18, the pressure members 22 and the transversal bar 24, including side couplings 26, constitute a whole conductive assembly and the side couplings 26 are also in electric connection with the tray 16, even if only in the two areas 28 having a thinner section.

In order to uniformly heat all the mass of the product P, the latter is placed into the container 14, closed by the cover 18 which is coupled to the sides of the tray 16 by means of the couplings 26 of the C-shaped transversal bar 24. The container is then inserted through one of the ends of the tunnel 12 and placed on conveyor means 20 which gradually shift the container toward the opposed end of the tunnel-shaped application device 12. During such shifting, the generator 10 is operated so that a magnetic field is generated within the tunnel-shaped application device 12.

In a first embodiment, the conveyor means 20 insulate the container from the metal surface of the tunnel-shaped application device as shown in FIG. 2. In this way, the metal system constituted by the container and the transversal bar 24 behaves like a metal coil involved by a magnetic field and, therefore, is crossed by currents which, on their turn, generate a magnetic field involving the meat-product P. Furthermore, because of the shape of the cover and of the tray, a difference of potential is generated between said two elements thus producing, within the container, also an electric field involving the meat-product P.

Therefore, the meat-product is exposed to the combined action of the oscillating electric and magnetic fields which cause the same to heat, not only superficially but also deeply. The action of the magnetic field prevails on the action of the electric field when the product P, at a certain stage of its cooking, behaves as a conductor, while the contrary happens at those stages of its cooking during which the product behaves as dielectric. In order to avoid that an electric contact between the cover 18 and the lead-in edge 16a of the tray 16 nullifies the capacitive effect and therefore the electric field involving the meat-product P, it is important that continuous hollow space formed by air or an insulating material is always present between the cover 18 and the tray 16.

Figure 3:
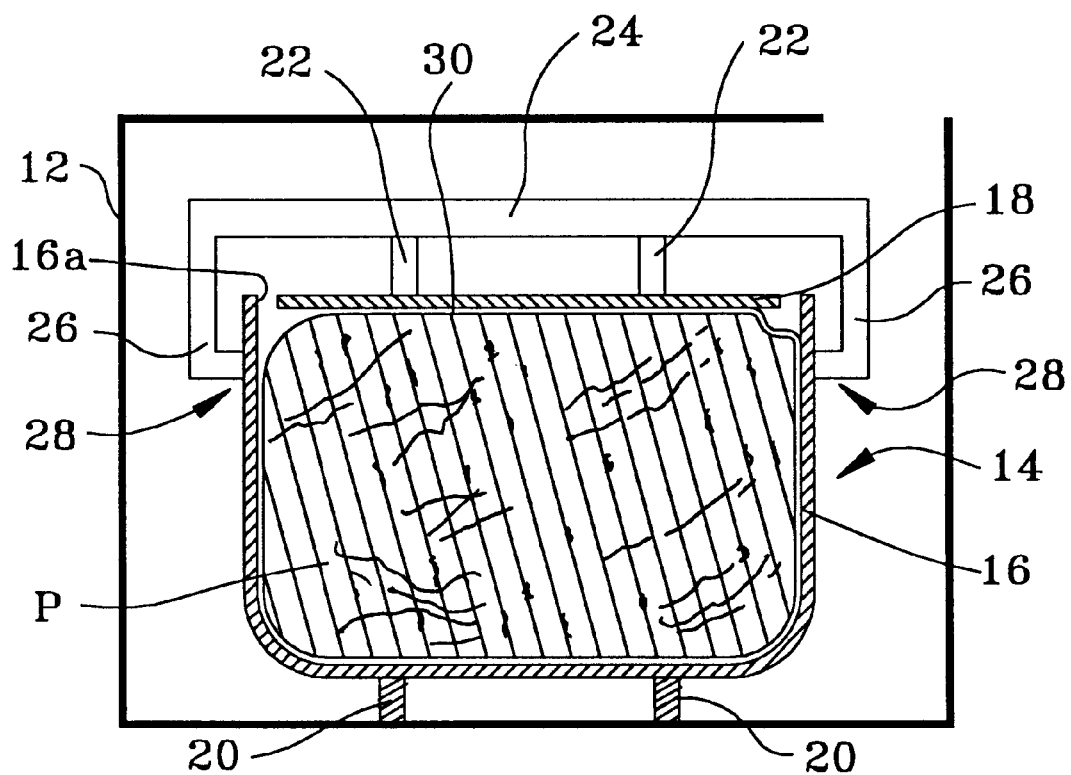
FIG. 3 is a cross-sectional view of the tunnel-shaped application device of FIG. 1, in which a container is conductively connected to the application device by a conveyor.

In the alternative embodiment of the invention shown in FIG. 3, in which the container 14 is electrically connected with the tunnel-shaped application device 12 by means of the conductive conveyor means 20, the oscillating magnetic field involving the meat-product is directly generated by the container 14 which becomes an extension of the application device 12. In a way which is absolutely similar to the above, the flow of currents within the container and the bar 24 causes a difference of potential between the tray 16 and the cover 18 thus generating an oscillating electric field involving the product P.

By means of an apparatus like the one described above as a non-restrictive example, it is possible to reduce to one fifth the time necessary to heat and/or cook the meat-product P in comparison to the traditional techniques of steam-cooking. Furthermore, it is possible to use containers or moulds which are very similar, if not identical, to those used for traditionally cooking meat-products, particularly for the production of baked hams.

Clearly, without prejudice to the principle of the invention, the embodiments and the details of implementation may be widely changed without drawing away from the scope of this invention.

What is claimed is:

1. Industrial apparatus to head food products, comprising a generator for generating oscillating voltage at a predetermined radio frequency, a first application device connected with the generator to generate a first electromagnetic field oscillating at the predetermined radio frequency, a second application device including at least two opposed portions between which, during a heating operation, a food product is placed, the second application device being crossed by radio frequency electric currents formed by the first electromagnetic field of the first application device to induce a second oscillating electromagnetic field which is superimposed onto the first electromagnetic field, said electromagnetic fields in combination, heating an entire mass of a food product at a uniform temperature.

2. Industrial apparatus according to claim 1, wherein the first application device is an inductive application device, the second application device being electrically insulated from the first application device, the first oscillating electromagnetic field generated by the first application device generating within the second application device a difference of voltage potential.

3. Container to cook food products within an industrial apparatus according to claim 1, wherein the second application device comprises a metal container including a tray having a lead-in edge and a cover which, when the container is closed, is insulated from the lead-in edge of the tray by an electrically insulating hollow space, and a closing member electrically connecting the cover and the tray.

4. Container according to claim 3, wherein the closing member includes pressure members to press the cover against the food product placed, during the operation, within the tray.

5. Industrial apparatus to heat food products, comprising a generator for generating oscillating voltage at a predetermined radio frequency, and a tunnel-shaped inductive application device to transform the oscillating voltage generated by the generator into an electromagnetic field, and a conveyor to continually insert and extract individual containers containing food products into and from respective opposed ends of the tunnel-shaped inductive application device.

6. Apparatus according to claim 5, wherein the containers include a tray and a cover.

7. Apparatus according to claim 6, wherein the containers are made of a conductive material, the cover being electrically connected with the tray through a conductive portion.

8. Apparatus according to claim 7, wherein the tray is electrically connected with the tunnel-shaped inductive application device.

9. Apparatus according to claim 8, wherein the conveyor includes members which support and drag the containers, and electrically connect the tunnel-shaped application device and the containers.

10. Apparatus according to claim 7, wherein the container is electrically insulated from the tunnel-shaped inductive application device.

11. Apparatus according to claim 10, wherein the conveyor includes members which support and drag the containers and which electrically insulate said containers from the tunnel-shaped inductive application device.

12. Apparatus according to claim 6, wherein the containers act as a second application device applying a second electromagnetic field to the food product therein.

13. Apparatus according to claim 5, wherein the conveyor includes members which support and drag the containers and which electrically connect the tunnel-shaped application device and the containers.

14. Apparatus according to claim 5, wherein the conveyor includes members which support and drag the containers and which electrically insulate said containers from the tunnel-shaped inductive application device.

15. Apparatus according to claim 5, wherein the containers operate as a second application device which is crossed by radio frequency electric currents from the electromagnetic field of the tunnel-shaped inductive application device, which induce a second electromagnetic field having electric and magnetic components in each of the containers, which second electromagnetic field combines with the electromagnetic field of the tunnel-shaped inductive application device to heat at a uniform temperature the entire mass of the food product within the respective container.

16. An apparatus to heat food products comprising:
   a generator for generating oscillating voltage at a predetermined radio frequency;
   a tunnel-shaped inductive application device connected with the generator to generate a first electromagnetic field oscillating at the predetermined radio frequency;
   a plurality of containers made of a conductive material, each of the containers comprising a tray containing a food product and a cover covering the food product within the tray; and
   a conveyor for conveying the containers through the tunnel-shaped inductive application device;
   wherein, during a heating operation, the first tunnel-shaped inductive application device generates the first electromagnetic field which provides radio frequency electric currents onto each of the containers to induce an oscillating magnetic field in each of the respective containers, which is superimposed onto the first oscillating electromagnetic field to heat the food product in each of the respective containers at a uniform temperature as the containers pass through the tunnel-shaped inductive application device.

17. Apparatus according to claim 16, wherein the container further comprises a closing member closing the cover on the tray and electrically connecting the cover and the tray, the tray and cover substantially enclosing the food product in the container.

18. Apparatus according to claim 16, wherein the conveyor electrically insulates the containers from the tunnel-shaped inductive application device and wherein the tunnel-shaped inductive application device substantially encloses four sides of the containers.

19. Apparatus according to claim 16, wherein the conveyor electrically connects the containers to the tunnel-shaped inductive application device and wherein the tunnel-shaped inductive application device substantially encloses four sides of the containers.

* * * * *